Jan. 12, 1971 R. BREISTEIN 3,553,921
WALL CONSTRUCTION, PARTICULARLY FOR LOAD-BEARING WALLS
Filed June 26, 1968 2 Sheets-Sheet 1
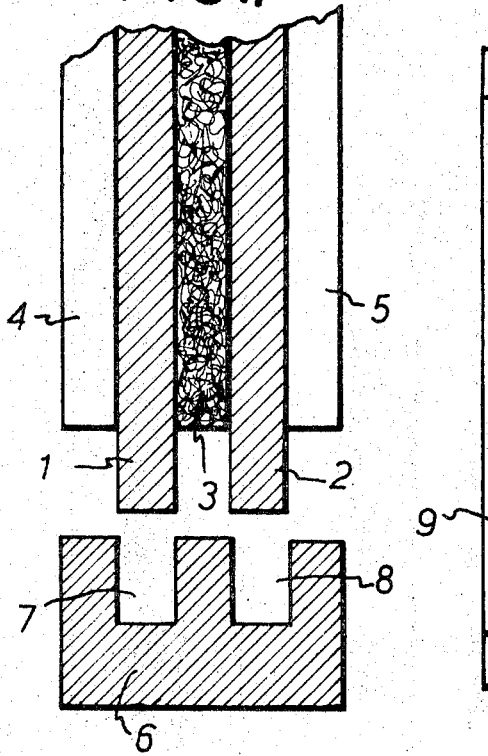
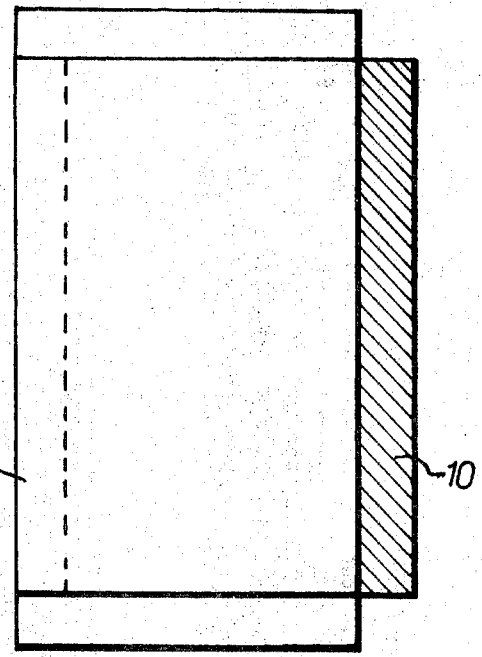
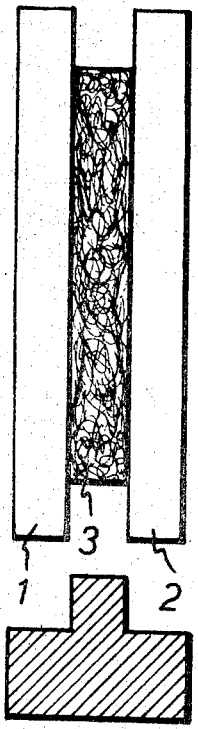
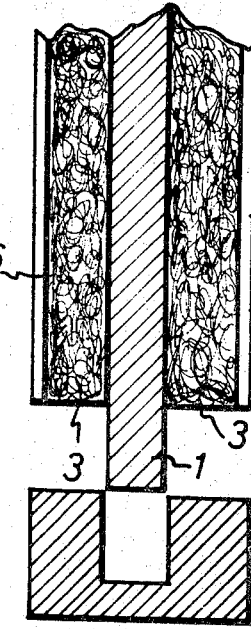
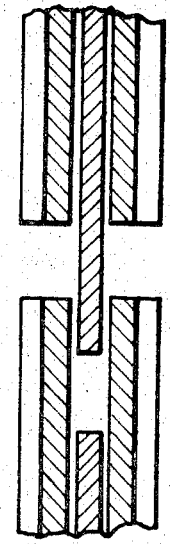
INVENTOR.
Rasmus Breistein
BY
Pennie Edmonds, Morton, Taylor & Adams
Attorneys Jan. 12, 1971  R. BREISTEIN  3,553,921
WALL CONSTRUCTION, PARTICULARLY FOR LOAD-BEARING WALLS
Filed June 26, 1968  2 Sheets-Sheet 2
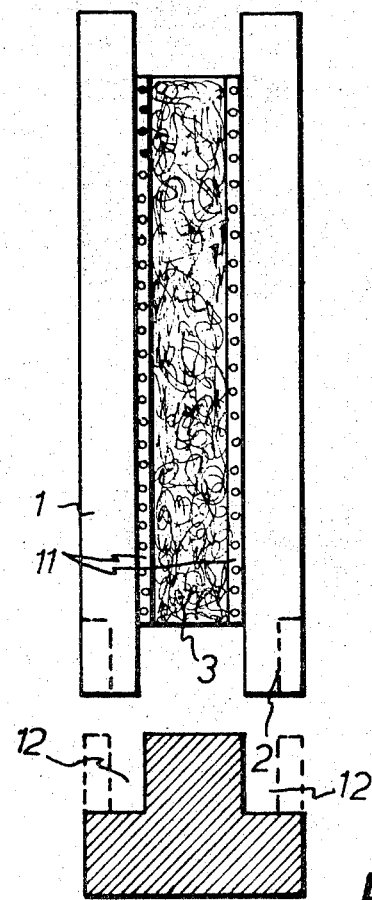
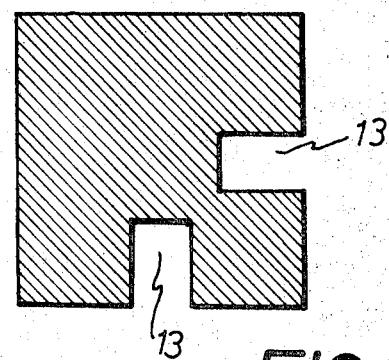
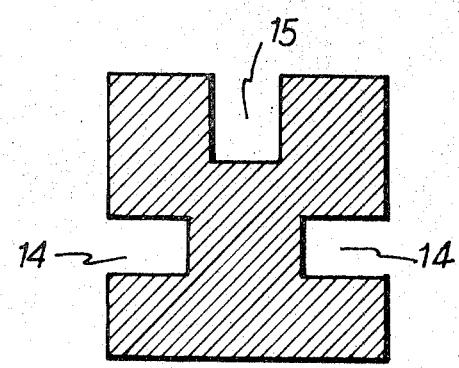
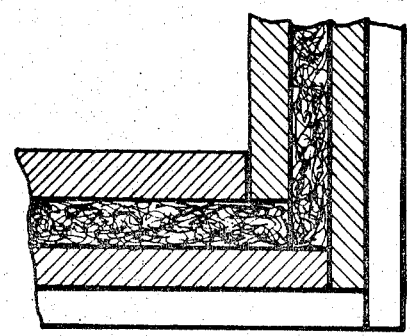
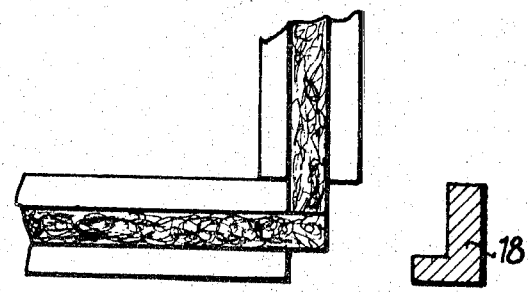
INVENTOR.
Rasmus Breistein
BY
Pennie, Edmonds, Morton, Taylor & Adams
Attorneys

United States Patent Office 3,553,921
Patented Jan. 12, 1971

3,553,921
WALL CONSTRUCTION, PARTICULARLY FOR LOAD-BEARING WALLS
Rasmus Breistein, 120 Lommedalsveien,
Gjettum, Norway
Filed June 26, 1968, Ser. No. 740,273
Claims priority, application Norway, July 4, 1967,
168,937
Int. Cl. E04c 2/24; E04b 1/90
U.S. Cl. 52—593                                1 Claim

ABSTRACT OF THE DISCLOSURE

Wall construction, particularly for load-bearing walls, consisting of elements with at least three interjoined layers, of which at least two layers are load-bearing and one is heat insulating, wherein at least two outermost layers are load-bearing and are made of wood fibre boards and/or plywood boards, and the insulation layer or layers has a calculable compression and tensile strength, and can be worked with ordinary woodworking tools and are mechanically stable, for example expanded plastic, wherein the plastic insulation layer is through-going in at least the longitudinal direction of the wall.

---

Efforts within modern housbuilding have gone in the direction of prefabricating as much as possible of the building. It is common practice to produce both load-bearing walls and internal walls of elements which are manufactured at a factory and assembled to form a building on site. It has, however, proved in practice that the saving achieved by building in this manner has not been particularly great, if indeed there has been any saving at all. This is largely due to the fact that the production of wall elements has required a relatively large degree of manual labour. In the wall elements used hitherto, use has been made of a frame of wooden members which are clad on both sides and in which the space between the two claddings has been filled with one or another form of fibrous insulation. At least the two opposite and longitudinal frame members have had one or another form of connecting arrangement, for example mortice and tenon or tongue and groove. When such an element is to be made, it is therefore necessary to cut four lengths of timber which are to form the frame of the element. After this, the cladding, which may consist of planks or boarding, must be cut. Then the frame must be nailed together after which, one of the claddings is nailed to the frame with impregnated lining board or dampcourse laid in between. After this, the insulation must be fitted into the frame, and finally the final cladding may be nailed into position on the frame with a layer of membrane in between.

The production of such elements has been based on the construction of a conventional wooden building, namely a lower frame, the bottom rail or sill, and an upper frame, the top rail, and vertical posts, or uprights, which extend between these two frames. With the possible addition of diagonal stays, or cross struts, it is these components which are to absorb the static and dynamic loads to which the house will be subjected.

The present invention is based on a different method of transferring the forces from the top rail to the bottom rail. Instead of transferring the forces through individual, relatively slim posts (uprights) the aim is to transfer the forces along the entire extent of the element and thus the full extent of the wall.

On the basis of this theory, the invention aims at furnishing wall elements which can be produced completely industrially in a very rapid and cheap manner.

The elements, according to the invention, are of much less weight than those used hitherto, and will thus be cheaper to transport and simpler and quicker to assemble on site. Furthermore, the elements, according to the invention, will have an even heat transfer figure throughout the entire wall, which is not the case with wooden houses of conventional construction where the heat transfer figure is far more unfavourable in regions run through by a vertical post or upright. Similarly, with elements according to the invention, a far more favourable construction will be achieved in the joints between two elements; a draught-free connection being achieved, and a connection which has the same heat transfer figure as the remainder of the wall.

A further and very large advantage is that the elements, according to the invention, will be uniform throughout their entire extent. That is to say that any given cross-section through an element will have the same character.

When the materials in the wall element, according to the invention, are made of materials which can be worked with ordinary woodworking tools, this will mean that, in a finished building, it is possible to saw out an opening for ventilators, windows and doors, etc., anywhere at will.

These and other advantages are achieved according to the invention, by means of a wall construction, particularly for load-bearing walls, consisting of elements with at least three interjoined layers, of which at least two layers are load-bearing and one is heat insulating, and which is characterised in that at least the two outer layers are load-bearing and are made of wood-fibre boards and/or plywood sheets and that the layer, or layers of insulation have a calculable compression and tensile strength and that this layer, or these layers, can be worked with ordinary woodworking tools, and are mechanically stable such as, for example, expanded plastic, and that the layer of insulation is through-going at least in the longitudinal direction of the wall. A further characteristic feature of the invention is that the insulation sheet, or insulation sheets and the load-bearing board or boards are displaced relative to one another in at least one direction, in such a manner that a mortice and tenon (tongue and groove) arrangement is produced, or a step-shaped edge on opposite edges. A further characteristic feature is that the insulation layer, or layers, is of greater breadth than the supporting layer, or layers, in order to achieve good contact by means of a squeezing effect between the insulation layers of two elements. A further characteristic feature of the invention is that the interjoining (gluing) between the layers and the insulating layer or layers, results in such strength that a bending of the load-bearing layers is obviated. It is also characteristic of the invention that at least the longitudinal edges of those elements which are intended to form a corner, have a step-shaped meshing surface.

The invention shall be described in more detail below with reference to the drawings:

FIG. 1 shows a cross section through an embodiment of an element according to the invention.

FIG. 2 shows an element seen from the side.

FIG. 3 shows a section through an element of a different design than FIG. 1.

FIGS. 4 and 5 show sections through two different embodiments for corner uprights.

FIGS. 6 and 7 show sections through two different designs of elements according to the invention with jointing connection to bottom rail (sill).

FIGS. 8 and 9 show two different methods of joining the elements according to the invention together in a corner.

FIG. 10 shows an example of a joint between two elements.

The element in FIG. 1 consists of two load-bearing boards 1 and 2 which for example may be made of chipboard or plywood. Between these two layers and displaced relative to them, there is positioned an insulating sheet 3 which is glued firmly to the supporting boards 1 and 2. The material in the insulating sheet 3 must have a certain compression and tensile strength. An expedient material here would be cellular plastic, for example "Isopor." On the outer sides of the load-bearing boards 1 and 2, profiled boards 4 and 5, for example of plastic, may be affixed. This is, however, no requirement from the constructional point of view, but is purely for the sake of appearance. The elements are lowered onto a profiled sill 6 which has grooves 7 and 8 which accept the protruding edges of the load-bearing boards 1 and 2.

As will be seen from FIG. 2, the layers are not only displaced relative to one another in the vertical direction, but also in the horizontal direction, with the result that, for example, tongue and groove connections are formed along the longitudinal edges 9 and 10 of the elements.

FIG. 3 shows a modification of the board shown in FIG. 1, in that between the outer load-bearing boards 1 and 2 and the inner sheet of insulation material 3, boards 11 of a relatively rigid material are laid, for example hard or semihard fibre boards. These boards will increase the insulation whilst at the same time they will be able to absorb some of the load when they are glued together with the outer boards 1 and 2 and the layer of insulation material 3. The bottom rail, or sill, will in this case be of a somewhat different design than in FIG. 1, in that it will have the shape of an inverted T in which the milled grooves 12 will accept the protruding edges of boards 1 and 2.

In FIGS. 4 and 5 sections are shown, of two different corner uprights. FIG. 4 is intended for a normal external corner in which the protruding edge along the longitudinal edge 10 in FIG. 2 is introduced into the grooves 13. The upright according to FIG. 5 is intended for use where a partition wall inside the house is to be joined into an outer wall. The outer wall elements are fitted into grooves 14, and the inner wall in groove 15.

FIG. 6 shows a partition wall element seen from the longitudinal side with insulation sheet 3 and load-bearing boards 1 and 2. FIG. 7 shows an element according to the invention in section. Here, the load-bearing board 1 is laid in the middle with two sheets of insulation 3, one on each side. Outside the insulation sheets, there is laid an outer cladding 16 and an inner cladding 17, both of an expedient type.

FIG. 8 shows how two elements are joined together in a corner, in that the board or sheet-shaped part in the elements are displaced stepwise relative to one another, forming a stepped meshing surface at the corner. FIG. 9 shows how two elements, in which a protruding edge of the insulating middle layer protrudes along the one longitudinal edge, are joined together at a corner. Here, the corner is covered with an L-shaped profile 18.

Finally, FIG. 10 shows how two elements with insulating middle layers displaced sideways, are connected together with the help of a tongue and groove joint.

What is claimed is:

1. In a wall construction for load-bearing building walls comprising laminated wall elements having a structure including a plurality of interjoined mechanically stable layers, each element comprising a load-bearing building wall element providing even heat transfer therethrough consisting of:
  (a) two outermost layers of load-bearing wooden boards,
  (b) a heat insulating layer of cellular plastic material located between said load-bearing wooden boards,
  (c) a load-bearing hard board bonded to the inside surface of each outermost layer of the building element and to the adjacent outer surface of the heat insulating layer,
  (d) said heat insulating layer being a continuous and uninterrupted layer throughout the length and width of the wall element and having compression and tensile strengths contributing to the load-bearing character of the resulting wall element,
  (e) the said heat insulating layer in the wall element being displaced at least in one direction relative to the outermost layers of the wall element to an extent that a tongue is formed along one longitudinal edge and a groove along an opposite longitudinal edge whereby adjacent wall elements may be fitted together in a tongue-and-groove interlocked joint, and
  (f) the heat insulating layer of the wall element, in its relaxed state, being slightly wider than the load-bearing outermost layers of the wall element and is compressible, whereby a squeeze contact is obtained between the heat insulating layers of adjacent building wall elements and said heat insulating layer is uninterrupted from element-to-element.

References Cited

UNITED STATES PATENTS

| | | | |
|---|---|---|---|
| 306,245 | 10/1884 | Hammerl | 52—615 |
| 2,200,650 | 5/1940 | Welch | 52—404 |
| 2,465,603 | 3/1949 | Potchen | 52—615 |
| 2,825,674 | 3/1958 | Prase | 52—615 |
| 3,113,401 | 12/1963 | Rose | 52—615 |
| 3,165,792 | 1/1965 | Pick | 52—615 |
| 3,299,594 | 1/1967 | Kellert | 52—284 |
| 3,364,645 | 1/1968 | Wenzelberger | 52—615 |
| 1,995,264 | 3/1935 | Mason | 52—592 |
| 2,904,991 | 9/1959 | Vaughan | 52—593 |
| 3,363,378 | 1/1968 | Palfey | 52—309 |
| 3,420,023 | 1/1969 | Gregori | 52—593 |

FOREIGN PATENTS

| | | | |
|---|---|---|---|
| 807,749 | 1957 | France | 52—615 |
| 775,203 | 1957 | Great Britain | 52—404 |
| 920,043 | 1963 | Great Britain | 52—404 |
| 1,182,107 | 1959 | France | 52—595 |

HENRY C. SUTHERLAND, Primary Examiner

U.S. Cl. X.R.

52—615